United States Patent [19]

Matney

[11] Patent Number: 4,694,324

[45] Date of Patent: Sep. 15, 1987

[54] MEASUREMENT OF SC/H PHASE USING A POLAR DISPLAY

[75] Inventor: Earl G. Matney, Newberg, Oreg.

[73] Assignee: Tektronix, Inc., Beaverton, Oreg.

[21] Appl. No.: 602,859

[22] Filed: Apr. 23, 1984

[51] Int. Cl.$^4$ .......................................... H04N 17/02
[52] U.S. Cl. ...................................................... 358/10
[58] Field of Search ................. 358/10, 19; 324/83 A, 324/88

[56] References Cited

U.S. PATENT DOCUMENTS

| | | | |
|---|---|---|---|
| 3,958,269 | 5/1976 | Davis | 358/10 |
| 4,024,571 | 5/1977 | Dischert et al. | 358/19 |
| 4,180,829 | 12/1979 | Pires | 358/10 |
| 4,388,637 | 6/1983 | Blair | 358/10 |
| 4,454,530 | 6/1984 | Yoshinaka et al. | 358/10 |
| 4,470,064 | 9/1984 | Michener | 358/10 |

FOREIGN PATENT DOCUMENTS 2921969 12/1980 Fed. Rep. of Germany ........ 358/10

*Primary Examiner*—John W. Shepperd

[57] ABSTRACT

A circuit for use with a vectorscope to indicate SC/H phase of a composite video signal comprises an oscillator for generating a continuous wave signal at subcarrier frequency and having its phase locked to the horizontal sync point of the video signal, and a switch for connection between the output terminal of the filter of the vectorscope and the second inputs of the demodulators of the vectorscope and for connection also to the oscillator, for alternately connecting the subcarrier burst from the filter of the vectorscope and the sync locked continuous wave from the oscillator to the demodulators. When the subcarrier burst is connected to the demodulators, the vectorscope provides an indication at a predetermined angle of the polar display of the vectorscope, whereas when the sync locked continuous wave signal is connected to the demodulators the vectorscope provides an indication at a position of the polar display that is angularly spaced from a predetermined axis of the polar display by an angle that depends upon the difference in phase, within the subcarrier cycle, between the sync locked continuous wave signal and the subcarrier burst.

3 Claims, 9 Drawing Figures

MEASUREMENT OF SC/H PHASE USING A POLAR DISPLAY

This invention relates to the measurement of SC/H phase using a polar display.

BACKGROUND OF THE INVENTION

It is well known that the composite color video signals that are conventionally broadcast, for example in the NTSC format, contain not only picture information (luminance and chrominance components) but also timing information (vertical sync pulses and horizontal sync pulses) and other reference information (e.g. equalizing pulses and color burst). As shown in FIG. 1, the horizontal sync pulse 2 and burst 4 both occur in the horizontal blanking interval, i.e., the interval between the active line times of consecutive horizontal scan lines. The horizontal sync pulse is a negative-going pulse having an amplitude of 40 IRE units, the 50 percent point 6 of the leading edge of the sync pulse being regarded as the horizontal sync point. Burst follows the horizontal sync pulse in the horizontal blanking interval and comprises a sinusoidal wave. The peak-to-peak amplitude of the burst is 40 IRE units, and immediately before and after the burst the signal is at blanking level (zero IRE). The burst ideally has a sine-squared envelope, and builds up from, and decays to, blanking level within one or two cycles of the burst wave. In accordance with EIA (Electronics Industries Association) standard RS 170 A, the start of burst is defined by the zero-crossing (positive or negative slope) that precedes the first half cycle of subcarrier that is 50 percent or greater of the burst amplitude, i.e., 40 IRE. The reference subcarrier burst is used in the television receiver to control a phase-locked oscillator which generates a continuous wave at subcarrier frequency and is used to extract the chrominance information from the composite video signal.

Although the NTSC frame is made up of 525 lines which are scanned in two interlaced fields of 262.5 lines each, the NTSC color signal requires a four field sequence. In accordance with the definitions of the fields contained in standard RS 170 A, the zero crossing of the extrapolated color burst (the continuous wave at subcarrier frequency and in phase with burst) must be coincident with the sync point of the immediately preceding horizontal sync pulse on even numbered lines, and the pattern of sync and burst information for fields 1 and 3 is identical except for the phase of burst. Thus, in field 1, the positive-going zero crossing of the extrapolated color burst coincides with the sync point on even numbered lines whereas in field 3 it is the negative-going zero crossing that coincides with the sync point on even numbered lines. Standards such as that set forth in RS 170 A are required in order to facilitate matching between video signals from different sources and also to facilitate operation of video signal recording and processing equipment. Accordingly, in order to identify the different fields of the four field color sequence, and to adjust the subcarrier to horizontal sync (SC/H) phase so as to achieve the desired coincidence between the zero crossing point of the extrapolated color burst and the sync point, it is necessary to be able to measure the phase of the subcarrier burst relative to the sync point.

Several attempts have previously been made to measure SC/H phase. For example, using the Tektronix 1410 signal generator, it is possible to generate a subcarrier in the middle of an unused line. Since the leading edge of the equalizing pulses are midway between sync pulses, a measurement of subcarrier to horizontal phase can be implied by comparing the subcarrier with the equalizing pulse timing. Alternatively the 1410 signal generator can generate a burst phased subcarrier during horizontal blanking which replaces a sync pulse and which can be compared with the remaining sync pulses. However, this equipment is not always available to technicians who need to make SC/H phase measurements. The GVG 3258 SC/H phase meter provides a digital output of the phase difference between subcarrier and horizontal sync, but this again requires availability of dedicated equipment.

The vectorscope, which provides a polar display of the amplitude and phase of signal components at subcarrier frequency, is commonly used by video engineers and technicians, but the conventional vectorscope cannot be used to measure SC/H phase.

As used herein, the term "vectorscope" means an instrument having an input terminal, a display surface, means for generating a visible dot on the display surface, X and Y deflection means for deflecting the position of the visible dot in mutually perpendicular rectilinear directions, a subcarrier regenerator connected to the input terminal for generating a continuous wave signal at subcarrier frequency from, and phase-locked to, the subcarrier burst of a video signal, first and second demodulators having their outputs connected to the X and Y deflection means respectively and each having first and second inputs, means connecting the output of the subcarrier regenerator to the first inputs of the first and second demodulators with a quarter-period relative phase difference, and a filter which passes the subcarrier burst of the video signal and has an output terminal for connection to the second inputs of the first and second demodulators. The vectorscope provides a polar display of the amplitude and phase of signal components at subcarrier frequency.

SUMMARY OF THE INVENTION

According to a first aspect of the present invention there is provided a circuit for use with a vectorscope to indicate SC/H phase of a composite video signal, comprising oscillator means for generating a continuous wave signal at subcarrier frequency and having its phase locked to the horizontal sync point of the video signal, and switch means for connection between the output terminal of the filter of the vectorscope and the second inputs of the demodulators of the vectorscope and for connection also to the oscillator means, for alternately connecting the subcarrier burst from the filter of the vectorscope and the sync locked continuous wave from the oscillator means to the demodulators, so that when the subcarrier burst is connected to the demodulators the vectorscope provides an indication at a predetermined angle of the polar display of the vectorscope, whereas when the sync locked continuous wave signal is connected to the demodulators the vectorscope provides an indication at a position of the polar display that is angularly spaced from a predetermined axis of the polar display by an angle that depends on the difference in phase, within the subcarrier cycle, between the sync locked continuous wave signal and the subcarrier burst.

According to a second aspect of the present invention there is provided an instrument for use in indicating SC/H phase of a composite video signal, comprising an input terminal for receiving the composite video signal; a display device for providing a polar display, said display device having a display surface, means for generating a visible dot on the display surface, X and Y deflection means for deflecting the position of the visible dot in mutually perpendicular rectilinear directions, a subcarrier regenerator connected to the input terminal for generating a continuous wave signal at subcarrier frequency from, and phase-locked to, the reference subcarrier burst of the video signal, first and second demodulators having their outputs connected to the X and Y deflection means, respectively, and each having first and second inputs, means connecting the output of the subcarrier regenerator to the first inputs of the first and second demodulators with a quarter-period relative phase difference, and a filter which passes the subcarrier burst of the video signal; means for generating a continuous wave signal at subcarrier frequency and having its phase locked to the sync point of the video signal; and a switch for alternately connecting the sync locked continuous wave and the subcarrier burst to said second inputs of the demodulators, so that when the subcarrier burst is connected to the second inputs of the demodulators the display device displays an indication at a predetermined angular position of the polar display, whereas when the sync locked continuous wave is connected to the second inputs of the demodulators the display device displays an indication at a position of the polar display that is angularly spaced from a predetermined axis of the polar display by an angle that depends on the phase difference, on the subcarrier cycle, between the reference subcarrier wave and the sync locked continuous wave.

According to the third aspect of the present invention there is provided an instrument for use in indicating SC/H phase of a first and second video signals, comprising first and second input terminals for receiving the first and second video signals respectively; a display device for providing a polar display, said display device having a display surface, means for generating a visible dot on the display surface, X and Y deflection means for deflecting the position of the visible dot in mutually perpendicular rectlinear directions, a subcarrier regenerator connected to the first input terminal for generating a continuous wave signal at subcarrier frequency from, and phase-locked to, the subcarrier burst of the first video signal, first and second demodulators having their outputs connected to the X and Y deflection means respectively and each having first and second inputs, means connecting the output of the subcarrier regenerator to the first inputs of the first and second demodulators with a quarter-period relative phase difference, and a filter which is connected to the second input terminal for passing the subcarrier burst of the second video signal; first means connected to the first input terminal for generating a first continuous wave signal at subcarrier frequency and having its phase locked to the sync point of the first video signal; second means connected to the second input terminal for generating a second continuous wave signal at subcarrier frequency and having its phase locked to the sync point of the second video signal; and a switch for successively connecting the first and second sync locked continuous waves and the subcarrier burst of the second video signal to said second inputs of the demodulators, so that when the subcarrier burst is connected to the second inputs of the demodulators the display device displays an indication at a predetermined angular position of the polar display, whereas when one of the sync locked continuous waves is connected to the second inputs of the demodulators the display device displays an indication at a position of the angular display that is angularly spaced from a predetermined axis of the polar display by an angle that depends on the phase difference, in the subcarrier cycle, between the reference subcarrier wave and said one sync locked continuous wave.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
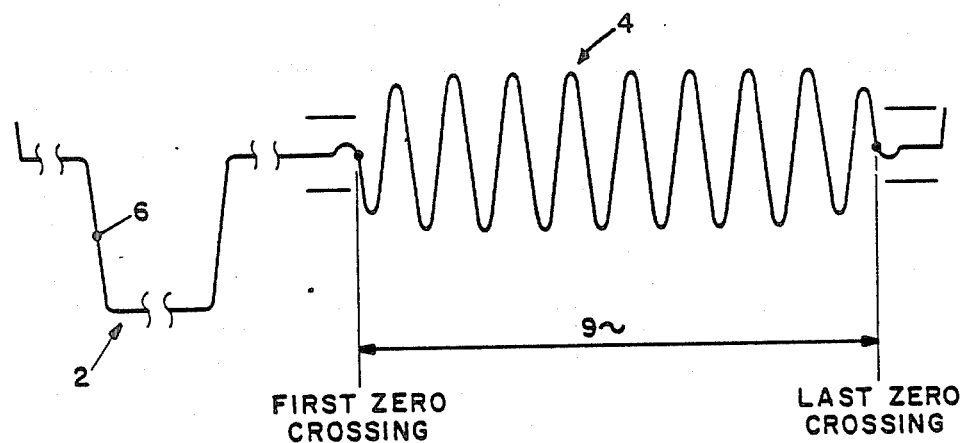
FIG. 1 illustrates diagrammatically the waveform of the NTSC video signal during the horizontal blanking interval.
Figure 2:
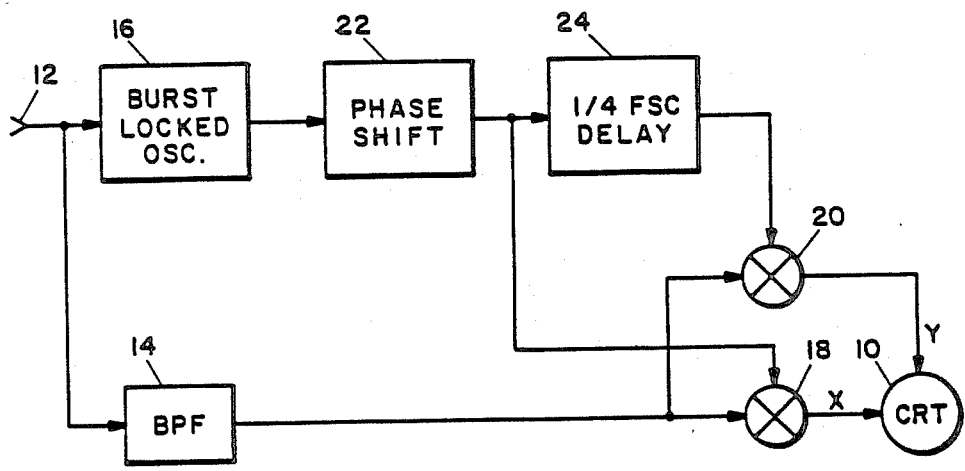
FIG. 2 illustrates in block form the major components of a conventional vectorscope for use in the NTSC system.

FIG. 2 of the drawings illustrates in block form the major components of a conventional vectorscope having a CRT 10. The composite video input signal is applied by way of an input terminal 12 to both a 3.58 MHz bandpass filter 14 and a burst locked oscillator 16. The burst locked oscillator 16 generates a continuous wave signal at subcarrier frequency (3.58 MHz) phased locked to burst. The bandpass filter 14 passes components of the composite video signal that have a frequency of 3.58 MHz, i.e., burst and the color components present during the active line time of the video signal. The output signal from the filter 14 is applied to two demodulators 18 and 20, which may simply be multipliers. The output of the oscillator 16 is applied through a variable phase shifter 22 directly to the demodulator 18 and to the demodulator 20 through a quarter period (of subcarrier frequency) delay 24. The output of the demodulator 18 is applied to the X-deflection plates of the CRT 10. The output of the demodulator 20 is applied to the Y-deflection plates of the CRT. It will thus be understood that the vectorscope provides a display in polar coordinates of the amplitude and phase relative to burst of each of the color components present in the composite video signal. By using the phase shifter 22 to rotate the entire display and align the vector representing burst with a predetermined axis of the display, usually the −X axis, a technician can determine whether the subcarrier components present in a test signal comply with prescribed standards defined by fixed graticule markings. However, the conventional vectorscope display yields no information concerning SC/H phase.

Figure 3:
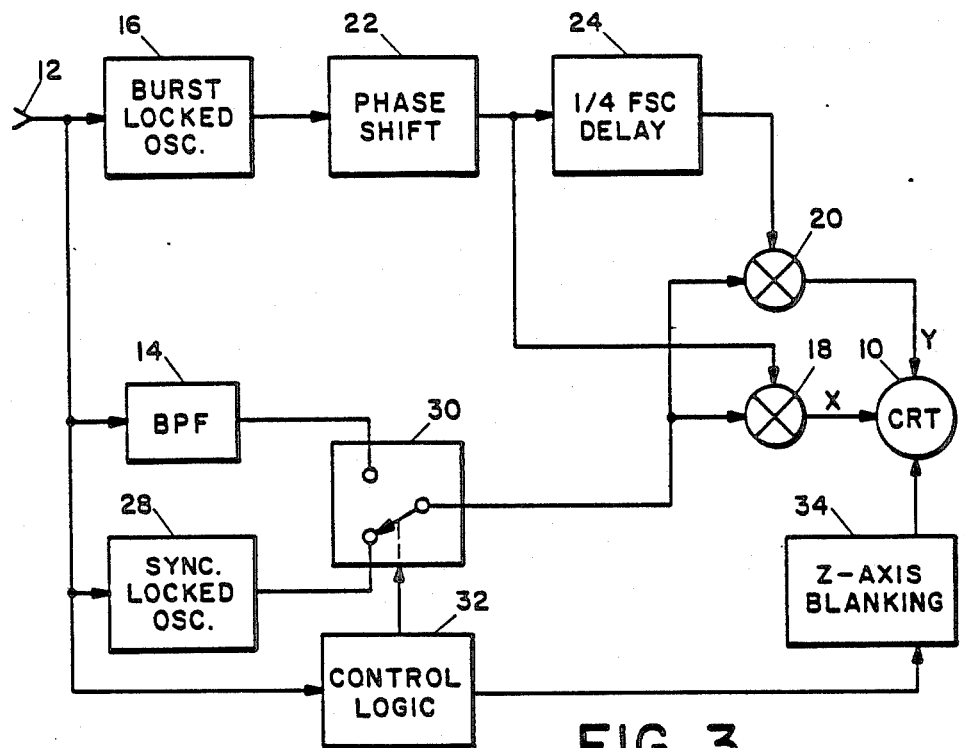
FIG. 3 illustrates in block form a vectorscope embodying the present invention, adapted for use in the NTSC system.

In the case of the vectorscope shown in FIG. 3, the composite video signal is also used to generate a signal representative of SC/H phase.

As shown in FIG. 3, the composite video signal is applied to a phase locked oscillator 28 which generates a continuous wave 3.58 MHz signal. On even numbered lines, a positive-going zero crossing of the continuous wave signal coincides in time with the sync point and on odd numbered lines a negative-going zero crossing of the continuous wave coincides with the sync point. This phase reversal of the continuous wave compensates for the 180° change in the phase relationship between sync and burst on consecutive lines in the NTSC system, and consequently the phase relationship between burst and the continuous wave signal does not change from line to line.

Figure 4:
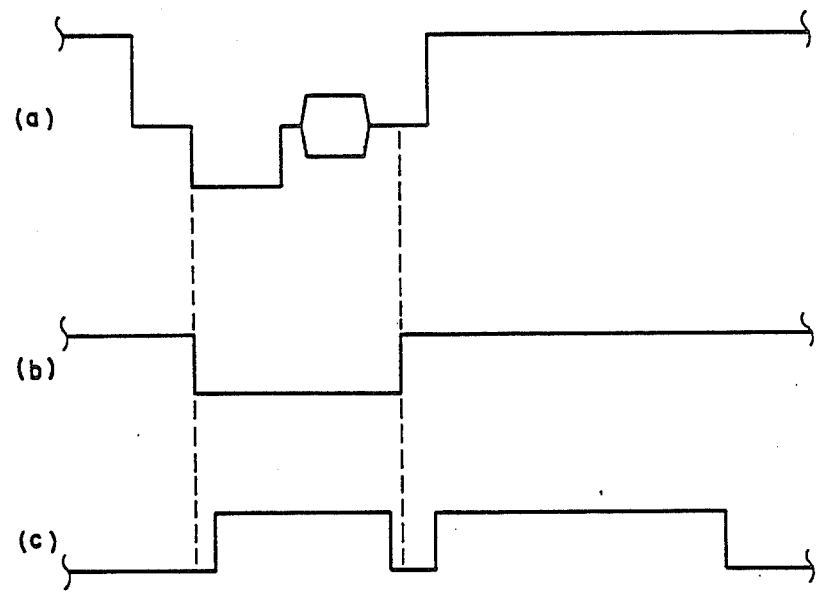
FIG. 4 illustrates waveforms useful in understanding operation of the FIG. 3 vectorscope.
Figure 5:
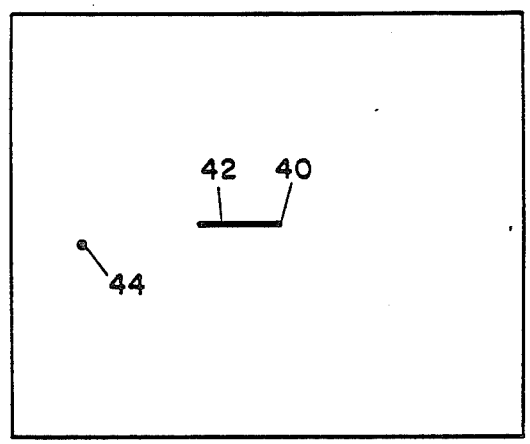
FIG. 5 illustrates the display provided by the FIG. 3 vectorscope.

The sync locked CW signal and the output of the chroma filter 14 are applied to a switch 30, which is controlled by a contol logic circuit 32. The control logic 32 controls not only selection between the filter 14 and the oscillator 28 but also Z-axis blanking of the CRT 10 by a blanking circuit 34. The manner of operation of the control logic 32 when the vectorscope is in SC/H phase display mode is indicated in FIG. 4, in which the waveform (a) represents the composite video signal, the waveform (b) represents the state of the switch 30 and the waveform (c) represents the state of the blanking circuit 34. When the vectorscope is in its normal display mode, the control logic 32 causes the switch 30 to select continuously the filter 14, and the vectorscope functions in the manner described with reference to FIG. 2. When the vectorscope is operating in its SC/H phase display mode, the control logic 32 causes the switch to select the output of the filter 14 (waveform (b) low) only during sync and burst time, and to select the sync locked CW (waveform (b) high) during the remainder of the line time. The control logic 32 also controls the Z-axis blanking circuit 34 to blank the CRT 10 (waveform (c) low) during the switches between the filter 34 and the oscillator 28 and to unblank the CRT (waveform (c) high) for a portion of the time for which the filter 14 is selected, so as to provide the center dot 40 and burst vector 42 on the display, as shown in FIG. 5. The CRT is also unblanked for a portion of the active line time, during which the sync locked CW is selected, to display a vector representing the phase and amplitude of the sync locked CW on those lines. The duration of the latter unblanking is variable to control the intensity of the display of the sync locked CW vector relative to the burst vector and center dot. Preferably, the unblanking time is chosen so that only the outer extremity of the sync locked CW vector is visible, and therefore the sync locked CW vector is indicated by a dot 44. The amplitude of the sync locked CW is greater than that of burst, and therefore the sync locked CW vector extends beyond the burst vector and the dot 44 indicating sync locked CW is visually distinguishable from the burst vector even when it is disposed at the same angular position of the polar display. If the sync locked CW is in phase with burst, the dot 44 is at the same angular position of the polar display as the burst vector 42.

In the production of a television transmission using several video signal sources, it is necessary in order to avoid unacceptable signal degradation upon switching from a first source to a second source to ensure that the correct color frame relationship exists between the signals from the two sources. This can be done by ensuring that the subcarrier burst of each signal is in phase with sync of that signal, and that the bursts of the respective signals are in phase with each other. The vectorscope shown in FIG. 6 can be used to examine simultaneously the SC/H phase of two video signals.

Figure 6:
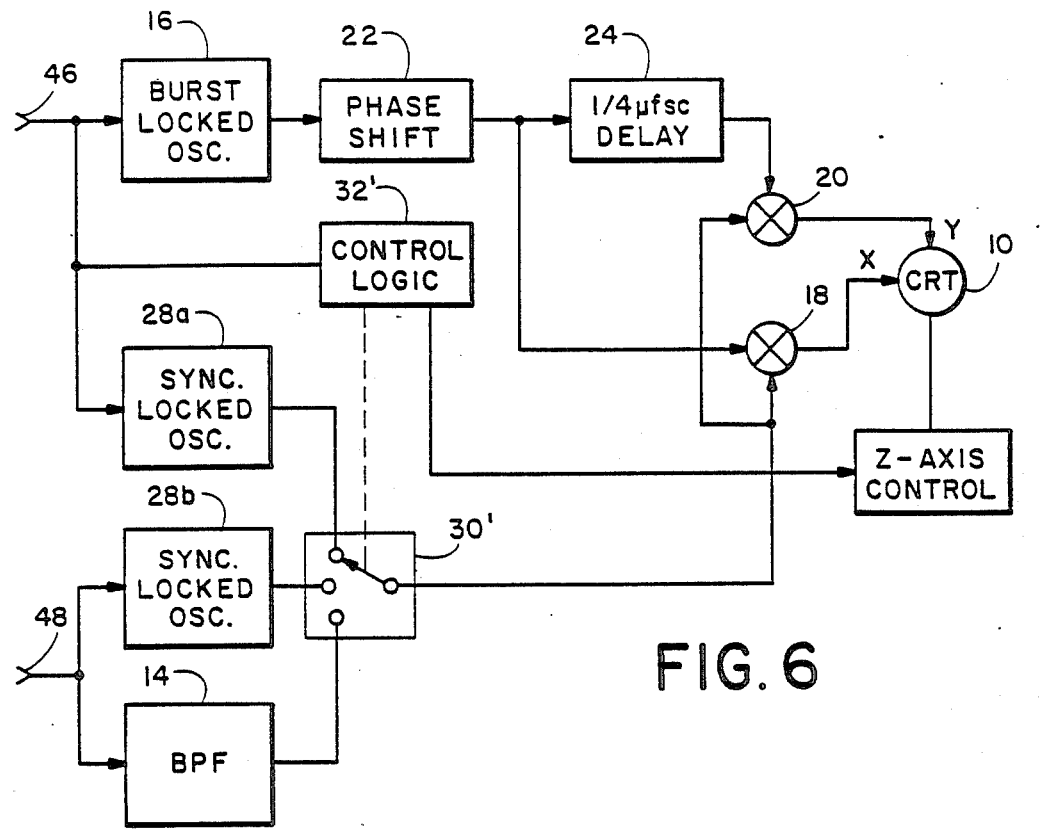
FIG. 6 illustrates in block form a second vectorscope embodying the present invention.
Figure 7:
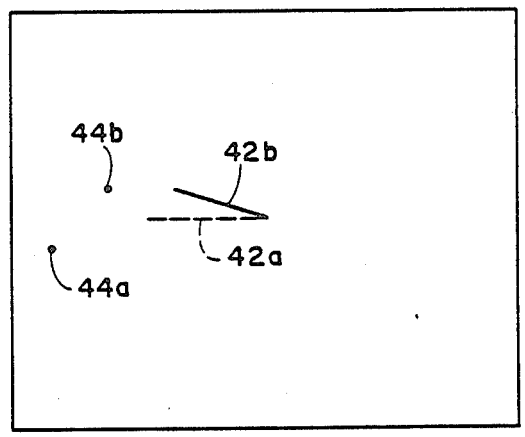
FIG. 7 illustrates the display provided by the FIG. 6 vectorscope.

In the case of FIG. 6, the signal being transmitted (the reference signal) is applied through an input terminal 46 to the burst locked oscillator 16 and to a first sync locked oscillator 28a. The signal that is to be selected (the selected signal) is applied through an input terminal 48 to a second sync locked oscillator 28b and to the bandpass filter 14. The outputs of the filter 14 and the oscillators 28 are applied to a switch 30' which selects among these outputs under control of the control logic 32'. The control logic causes the switch to select the output of the filter 14 only during burst and sync time of the selected video signal, the output of the oscillator 28a during line 1 of field 1 of the reference signal, and the output of the oscillator 28b at other times. The CRT 10 is blanked during switches between the oscillators 28a and 28b and the filter 14, and is unblanked for a portion of the time for which the filter 14 is selected. Accordingly, the CRT displays a sync dot 44a at an angular position representing SC/H phase of the reference signal and a vector 42b and a sync dot 44b whose relative angular positions represent SC/H phase of the selected video signal. The CW output signals provided by sync locked oscillators 28a and 28b are of different amplitudes, and therefore the two sync dots can be readily distinguished based on radial distance from the center dot.

The CRT does not display a vector representing phase of the reference color burst. On initial set-up, the reference signal may be connected to both terminals 46 and 48, in which case a vector indicated 42a and representing the phase of reference burst will be displayed, and by adjusting the phase shifter 22 the vector 42a may be aligned with a predetermined radius, e.g., the 180° radius, of the polar display. Thereafter, changes in the phase of reference burst will cause the entire display to rotate, whereas changes in the angular position of only the sync dot 44a represent changes in reference SC/H phase.

Figure 8:
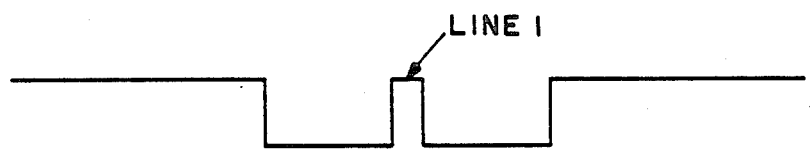
FIG. 8 illustrates a waveform useful in understanding operation of a vectorscope embodying the invention, adapted for use in the PAL system.
Figure 9:
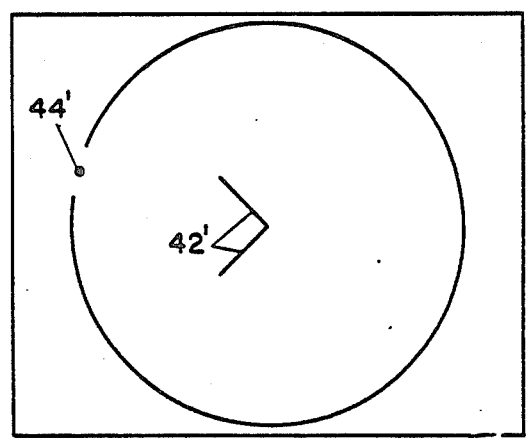
FIG. 9 illustrates the display provided by the FIG. 3 vectorscope, adapted for use in the PAL system.

A vectorscope embodying the invention and adapted for use in the PAL system comprises essentially the same functional elements as are shown in FIG. 3 or 6. However, in order to accommodate the 25 Hz offset that exists between burst and sync in the PAL system, the controls performed by the control logic 32 or 32' are somewhat different. Thus, if the control logic 32 of the FIG. 3 vectorscope carried out only the controls indicated by the waveforms shown in FIG. 4, the sync dot would describe a complete circle, because SC/H phase is different for every line of each field. In accordance with the PAL standard, SC/H phase is defined on line 1 of field 1. In the PAL version of the FIG. 3 vectorscope, the control logic 32 is used to blank the sync dot for a few lines before and after line 1, as indicated in FIG. 8. The resulting display is shown in FIG. 9, and it will be seen that the part circle formed by the unblanked sync dot on either side of the blanked portions aid in locating the dot 44' representing the sync locked CW vector for line 1. The resulting gaps in the circle form a coarse display of SC/H phase which is usable from a distance. For reasons that are well understood by persons skilled in the art, two burst vectors 42' are shown in FIG. 9. Similarly, in the case of the PAL version of the FIG. 6 vectorscope, the control logic 32' blanks the sync dot for a few lines before and after line 1 of the reference signal.

It will be appreciated that the invention is not restricted to the particular instruments that have been described with reference to FIGS. 3 and 6, since variations may be made therein without departing from the scope of the invention as defined in the appended claims, and equivalents thereof. For example, whereas in the case of FIG. 6 the vectorscope displays the subcarrier frequency components of only the selected video signal, if the production facility had only a small number of signal sources correct color framing of two video signals (the reference signal and the selected signal) may be achieved by comparing the two video signals directly. In this case, a second bandpass filter would be associated with the input terminal 24 and the switch 30 would select among four possible signals (two bursts and two sync locked CW signals). It would then be possible to provide a technician with information that would permit the selected video signal to be brought into the correct color frame relationship with the reference signal.

I claim:

1. A circuit for use with a vectorscope to indicate SC/H phase of a composite video signal, comprising oscillator means for generating a continuous wave signal at subcarrier frequency and having its phase locked to the horizontal sync point of the video signal, and switch means for connection between the output terminal of the filter of the vectorscope and the second inputs of the demodulators of the vectorscope and for connection also to the oscillator means, for alternately connecting the subcarrier burst from the filter of the vectorscope and the sync locked continuous wave from the oscillator means to the demodulators, so that when the subcarrier burst is connected to the demodulators the vectorscope provides an indication at a predetermined angle of the polar display of the vectorscope, whereas when the sync locked continuous wave signal is connected to the demodulators the vectorscope provides an indication at a position of the polar display that is angularly spaced from a predetermined axis of the polar display by an angle that depends on the difference in phase, within the subcarrier sycle, between the sync locked continuous wave signal and the subcarrier burst.

2. An instrument for use in indicating SC/H phase of a composite video signal, comprising:
   an input terminal for receiving the composite video signal;
   a display device for providing a polar display, said display device having a display surface, means for generating a visible dot on the display surface, X and Y deflection means for deflecting the position of the visible dot in mutually perpendicular rectilinear directions, a subcarrier regenerator connected to the input terminal for generating a continuous wave signal at subcarrier frequency from, and phase-locked to, the reference subcarrier burst of the video signal, first and second demodulators having their outputs connected to the X and Y deflection means respectively and each having first and second inputs, means connecting the output of the subcarrier regenerator to the first inputs of the first and second demodulators with a quarter-period relative phase difference, and a filter which passes the subcarrier burst of the video signal;
   means for generating a continuous wave signal at subcarrier frequency and having its phase locked to the sync point of the video signal; and
   a switch for alternately connecting the sync locked continuous wave and the subcarrier burst to said second inputs of the demodulators, so that when the subcarrier burst is connected to the second inputs of the demodulators the display device displays an indication at a predetermined angular position of the polar display, whereas when the sync locked continuous wave is connected to the second inputs of the demodulators the display device displays an indication at a position of the polar display that is angularly spaced from a predetermined axis of the polar display by an angle that depends on the phase difference, within the subcarrier cycle, between the reference subcarrier wave and the sync locked continuous wave.

3. An instrument for use in indicating SC/H phase of first and second video signals, comprising
   first and second input terminals for receiving the first and second video signals respectively;
   a display device for providing a polar display, said display device having a display surface, means for generating a visible dot on the display surface, X and Y deflection means for deflecting the position of the visible dot in mutually perpendicular rectilinear directions, a subcarrier regenerator connected to the first input terminal for generating a continuous wave signal at subcarrier frequency from, and phase-locked to, the subcarrier burst of the first video signal, first and second demodulators having their outputs connected to the X and Y deflection means respectively and each having first and second inputs, means connecting the output of the subcarrier regenerator to the first inputs of the first and second demodulators with a quarter-period relative phase difference, and a filter which is connected to the second input terminal for passing the subcarrier burst of the second video signal;
   first means connected to the first input terminal for generating a first continuous wave signal at subcarrier frequency and having its phase locked to the sync point of the first video signal;
   second means connected to the second input terminal for generating a second continuous wave signal at subcarrier frequency and having its phase locked to the sync point of the second video signal; and
   a switch for successively connecting the first and second sync locked continuous waves and the subcarrier burst of the second video signal to said second inputs of the demodulators, so that when the subcarrier burst is connected to the second inputs of the demodulators the display device displays an indication at a predetermined angular position of the polar display, whereas when one of the sync locked continuous waves is connected to the second inputs of the demodulators the display device displays an indication at a position of the angular display that is angularly spaced from a predetermined axis of the polar display by an angle that depends on the phase difference, in the subcarrier cycle, between the reference subcarrier wave and said one sync locked continuous wave.

* * * * *